United States Patent [19]
Taylor et al.

[11] Patent Number: 5,348,039
[45] Date of Patent: Sep. 20, 1994

[54] LARGE DIAMETER AND RELATIVELY HIGH PRESSURE RELIEF VALVE

[75] Inventors: Julian S. Taylor, 8300 SW. 8th St., Oklahoma City, Okla. 73128; C. Dean Couch, Oklahoma City, Okla.

[73] Assignee: Julian S. Taylor, Oklahoma City, Okla.

[21] Appl. No.: 169,242

[22] Filed: Dec. 20, 1993

Related U.S. Application Data

[63] Continuation-in-part of Ser. No. 35,766, Mar. 23, 1993, Pat. No. 5,273,065.

[51] Int. Cl.⁵ .............................................. F16K 17/40
[52] U.S. Cl. ...................................... 137/70; 251/282
[58] Field of Search ................. 251/282; 137/68.1, 70, 137/71, 494, 509

[56] References Cited

U.S. PATENT DOCUMENTS

| | | | |
|---|---|---|---|
| 5,193,575 | 3/1993 | Do | 137/509 |
| 5,271,428 | 12/1993 | Dunn et al. | 137/509 |

*Primary Examiner*—John C. Fox
*Attorney, Agent, or Firm*—Robert K. Rhea

[57] ABSTRACT

A pressure relief valve for monitoring pressure in relatively large diameter conductors containing relatively high fluid pressure. The valve having housing openings of equal diameter with respect to the conductor and a flow passageway provided with different diameter coaxial sleeves slidably receiving interconnected dual diameter pistons. The smaller diameter piston forms a flow passageway stop while the larger diameter piston generates a pressure differential with respect to the smaller diameter piston for moving both pistons toward a flow passageway open position in which a piston rod guides the pistons in their axial movement with respect to the sleeves and collapses a pressure collapsible pin supported by a pin cage connected with the valve body in axial alignment with the piston rod for opening the valve passageway and releasing fluid pressure from the conductor. The larger diameter piston is apertured to admit downstream fluid pressure to its low pressure side. The piston rod diameter is selected to equal the difference in cross sectional area of the piston surfaces exposed to downstream fluid thereby completely balancing the pistons with respect to downstream fluid pressure.

15 Claims, 2 Drawing Sheets

LARGE DIAMETER AND RELATIVELY HIGH PRESSURE RELIEF VALVE

This application is a continuation-in-part of an application filed by me in the United States Patent and Trademark Office on Mar. 23, 1993 under Ser. No. 08/035,766 for LARGE DIAMETER AND RELATIVELY HIGH PRESSURE RELIEF VALVE, now U.S. Pat. No. 5,273,065.

BACKGROUND OF THE INVENTION

1. Field of the invention

This invention relates to relief valves and more particularly to a collapsible pin relief valve for fluid systems of relatively large diameter.

In the past, a collapsible pin relief valve has been successful, by utilizing Euler's law for slender columns to obtain the critical load point at which the column will fail by buckling, for monitoring pressure in a conductor generating a force up to approximately 8,000 pounds (3,600 kg) against the pin.

A collapsible pin in a two inch piston diameter pressure relief valve, connected with a conductor of the same size, containing 5,000 psi (2,250 kg) generates a force on the collapsible pin on the order of 15,000 pounds (6,750 kg). It is desirable to reduce this pin force without reducing the piston diameter.

There is a need for a valve to monitor such pressure in a large diameter, for example, a 24 inch (61 cm) conductor with a 24 inch piston opening, but this requires an unrealistically large diameter collapsible pin. When the outlet port of such a valve is connected with an elevated tank having a relatively high static fluid pressure some means must be provided for balancing the downstream back pressure acting on the piston members in order for the valve to function as desired in monitoring upstream fluid pressure.

This invention solves this problem by providing a collapsible pin relief valve in which piston-like members of different diameter partially balance the upstream pressure acting on the collapsible pin and completely balances the downstream pressure.

2. Description of the prior art

The most pertinent prior patent is believed to be U.S. Pat. No. 5,012,834 issued May 7, 1991 to Julian S. Taylor for FLUID PRESSURE FLARE RELIEF VALVE.

This patent discloses a valve body connected with a fluid line in which the valve body is enlarged and provided with a lateral opening normally closed by a double wall valve head to form a valve head chamber laterally of a fluid passageway through the valve body.

The fluid passageway contains a box-like chamber having aligned bores in opposite walls normally closed by dual pistons secured to a piston rod projecting through the valve head chamber and through the closed end of a cylinder projecting into the valve head chamber and slidably supporting a smaller diameter pilot piston secured to the piston rod.

The outwardly projecting end of the piston rod supports one end of an excess fluid pressure collapsible pin supported at its other end by the end plate of a pin cage surrounding the collapsible pin and connected with the cylinder projecting out of the valve head chamber.

A spring urged poppet valve admits upstream fluid pressure to the valve head chamber, so that excess pressure above a predetermined value against the pilot piston and the piston remote from the valve head chamber unbalances the pistons, collapsing the pin to release the excess pressure through the passageway downstream outlet.

This invention is distinctive over this patent by providing a valve housing having a flow passageway interposed in a conductor containing upstream and downstream fluid under greater than atmospheric pressure. A guide piston is slidably mounted in the valve housing for movement toward and away from the passageway outlet port and is axially connected with a smaller diameter outlet piston for closing the passageway outlet port. A piston rod connected with the guide piston projects outwardly of the valve body and abuts one end of a collapsible pin supported at is other end by a pin cage means secured to the valve housing.

Upstream fluid pressure in the valve housing acts on confronting surfaces of the pistons and the collapsible pin holds the outlet piston on seat while the force on the pin is proportional to upstream pressure. Downstream fluid pressure in the valve housing is balanced by the pistons.

SUMMARY OF THE INVENTION

A valve body having axially aligned openings of different diameters and having a lateral inlet port intermediate the ends of its in-line openings is provided with integral inwardly open different diameter sleeves projecting inwardly from the respective in-line openings.

A tubular neck portion diametrically equal with the smaller sleeve and having a bolt flange at one end is integrally connected axially at its other end with the valve body and forms an outlet port.

A second tubular neck portion similarly diametrically equal with the inlet port and having a bolt flange at one end is integrally connected at its other end with the valve body.

The outwardly open end of the larger diameter sleeve is closed by a centrally bored disc-shaped cap diametrically greater than the sleeve for connection with the valve body opposite the fluid outlet port.

A guide piston slidable in the larger diameter sleeve is axially connected with one end of a smaller diameter tubular member. The tubular member has an outstanding annular flange at its other end forming an outlet piston normally closing the inward end of the outlet port sleeve.

The guide piston is centrally provided with a piston rod projecting through the central bore of the cap.

The central portion of the guide piston is apertured to admit downstream fluid to the low pressure end of the guide piston.

A cage member formed by a plurality of standards projecting longitudinally outward from the cap is interconnected at their opposite ends by a plate supporting a collapsible pin axially extending between the piston rod and the cage plate.

In another embodiment, the bolt flange equipped inlet and outlet neck members are elongated and cooperatively curved and disposed in axial alignment.

The principal object of the present invention is to provide a fluid pressure relief valve for high pressure fluid in relatively large diameter conductors or containers by pistons completely balancing downstream high pressure fluid and balancing out the major portion of upstream high pressure fluid in order to utilize a portion of the upstream high pressure, above a predetermined value, for biasing a pressure relief valve to an open position.

DESCRIPTION OF THE PREFERRED EMBODIMENTS

Figure 1:
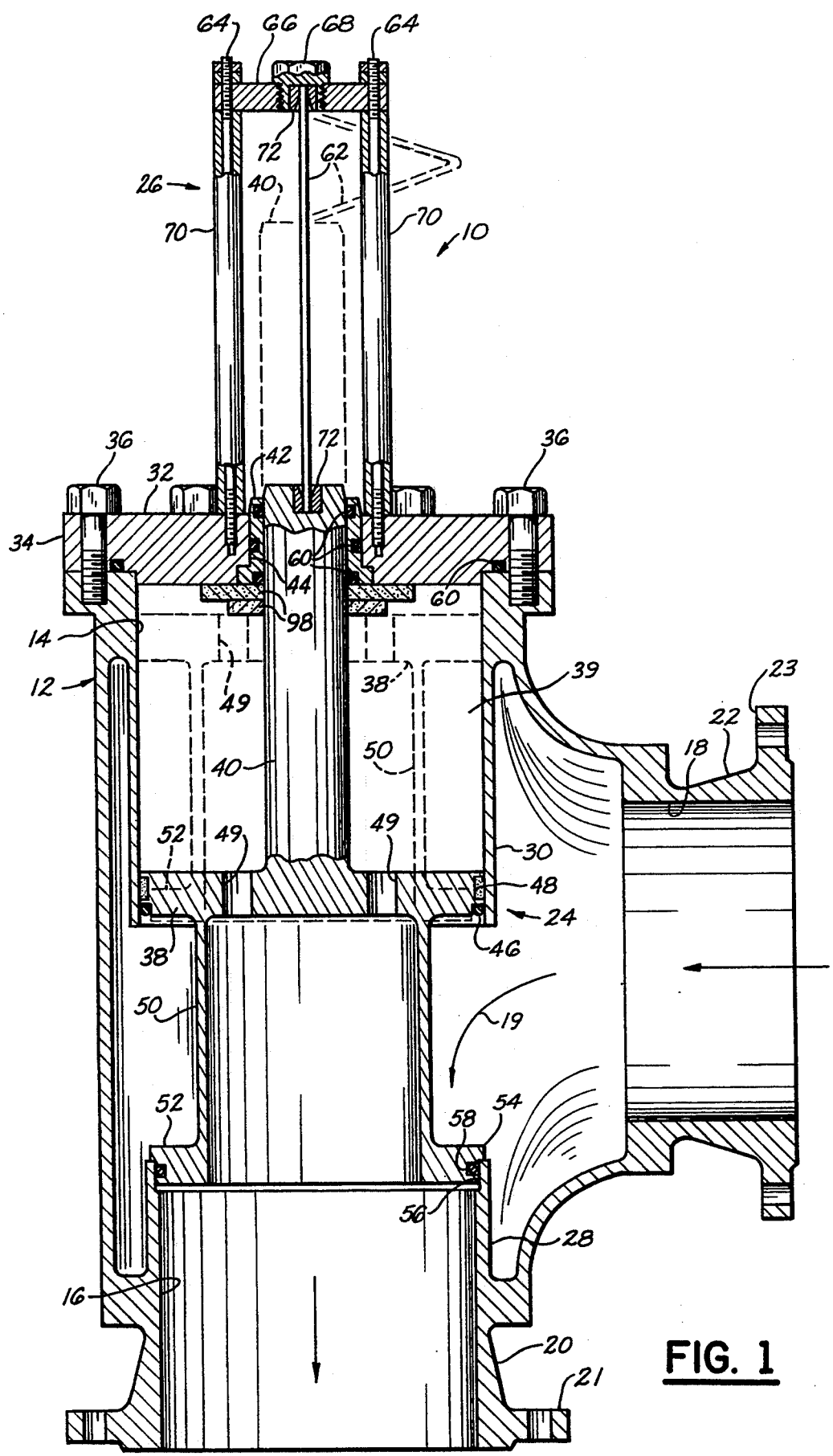
FIG. 1 is a vertical cross sectional view of one embodiment of the valve.

Like characters of reference designate like parts in those figures of the drawings in which they occur.

In the drawings:

Referring primarily to FIG. 1, the reference numeral 10 indicates the valve as a whole which is generally pipe Tee-shaped in overall configuration.

The valve 10 comprises a body 12 having coaxially aligned openings 14 and 16 normal to an inlet opening 18. The diameter of the opening 14 is greater than the diameter of the opening 16 for the reason presently believed apparent.

A tubular neck member 20 having an inside diameter equal with respect to the diameter of the outlet port opening 16 and having a bolt flange 21 at one end is integrally connected at its other end with the body 12 coaxial with the outlet port 16.

Similarly, a second tubular neck member 22 having a bolt flange 23 at one end is coaxially connected with the body inlet opening 18 for forming a fluid passageway 19 through the valve housing 12 when the valve 10 is biased to an open position, as hereinafter explained.

Sleeve and piston means 24 normally close the fluid passageway until released by pin and cage means 26, as hereinafter explained. A first sleeve 28 integral with the body 12 and diametrically equal with the outlet port 16 extends coaxially inward. A second sleeve or guide 30 integral with the body 12 and diametrically equal with the body opening 14 extends coaxially inward. The outwardly disposed end of the second sleeve 30 is closed by an end wall formed by a centrally bored disc-shaped cap 32 of larger diameter than the second sleeve 30 for forming a bolt rim 34 secured to the valve body 12 by bolts 36 for closing the sleeve 30 and opening 14 fluid tight.

The sleeve and piston means 24 further includes a disc-shaped pressure releasing guide piston 38 slidably received by the second sleeve 30 and defines a sleeve chamber 39. The guide piston 38 being centrally provided with a piston rod 40 longitudinally slidable in a bushing 42 coaxially disposed in the sleeve cap central bore 44 for guiding the piston rod during guide piston movement toward and away from the piston cap, as hereinafter explained. A pair of superposed layers of resilient material axially surrounds the rod 40 adjacent the cap 32 for the purpose presently explained.

The flange-like periphery of the guide piston is provided with an O-ring seal 46 for sealing with the inner surface of the second sleeve wall and a circumscribing band 48, preferably formed from friction reducing plastic material, such as that presently marketed under the Trademark NYLON having self lubricating properties when moved in frictional contact with metallic surfaces. The central portion of the guide piston or head 38 is apertured, as at 49, to provide fluid communication between the sleeve chamber 39 and the outlet port 16.

The piston surface opposite the rod 40 and outwardly of the apertures 49 is axially connected with one end of a tubular member 50 having an annular outstanding flange at its other end forming an outlet piston 52. The piston has a rabbeted edge forming a stop shoulder 54 which abuts the innermost end surface of the first sleeve 28. A second O-ring 58 seals with an annular valve seat 56 formed on the inner wall surface of the inward end portion of the first sleeve 28, thus, preventing fluid flow in the direction of the arrow 19. The diameter of the piston rod is chosen to equal, in cross section area, difference in transverse cross section area of the inside diameters of the sleeves 28 and 30 or the difference in surface areas of the pistons 38 and 52 for the reason presently explained.

Other O-ring seals 60 seal the sleeve cap 32 with the valve body, the bushing 42 with the sleeve cap 32 and the piston rod 40 with the bushing 42 in a conventional manner.

The pin cage means 26 is axially connected with the sleeve cap 32 and extends beyond the outward end of the piston rod 40 for axially supporting an axially collapsible pressure relief pin 62 in combination with the adjacent end of the piston rod.

The pin cage means comprises a plurality (3 or 4), three being shown, rod like bolts 64 connected at one end in 90° spaced relationship with the sleeve cap 32 and having an end plate 66 at their outward ends axially supporting a threadedly connected pin holder 68. Each of the bolts 64 is surrounded by a sleeve spacer 70 for maintaining the pin end plate 66 a predetermined distance from the outwardly projecting end of the piston rod 40. The outwardly projecting end of the piston rod and the downwardly projecting portion of the pin holder 68 are each centrally bored for receiving pin bushings 72, for nesting respective end portions of the collapsible pin 62.

Figure 2:
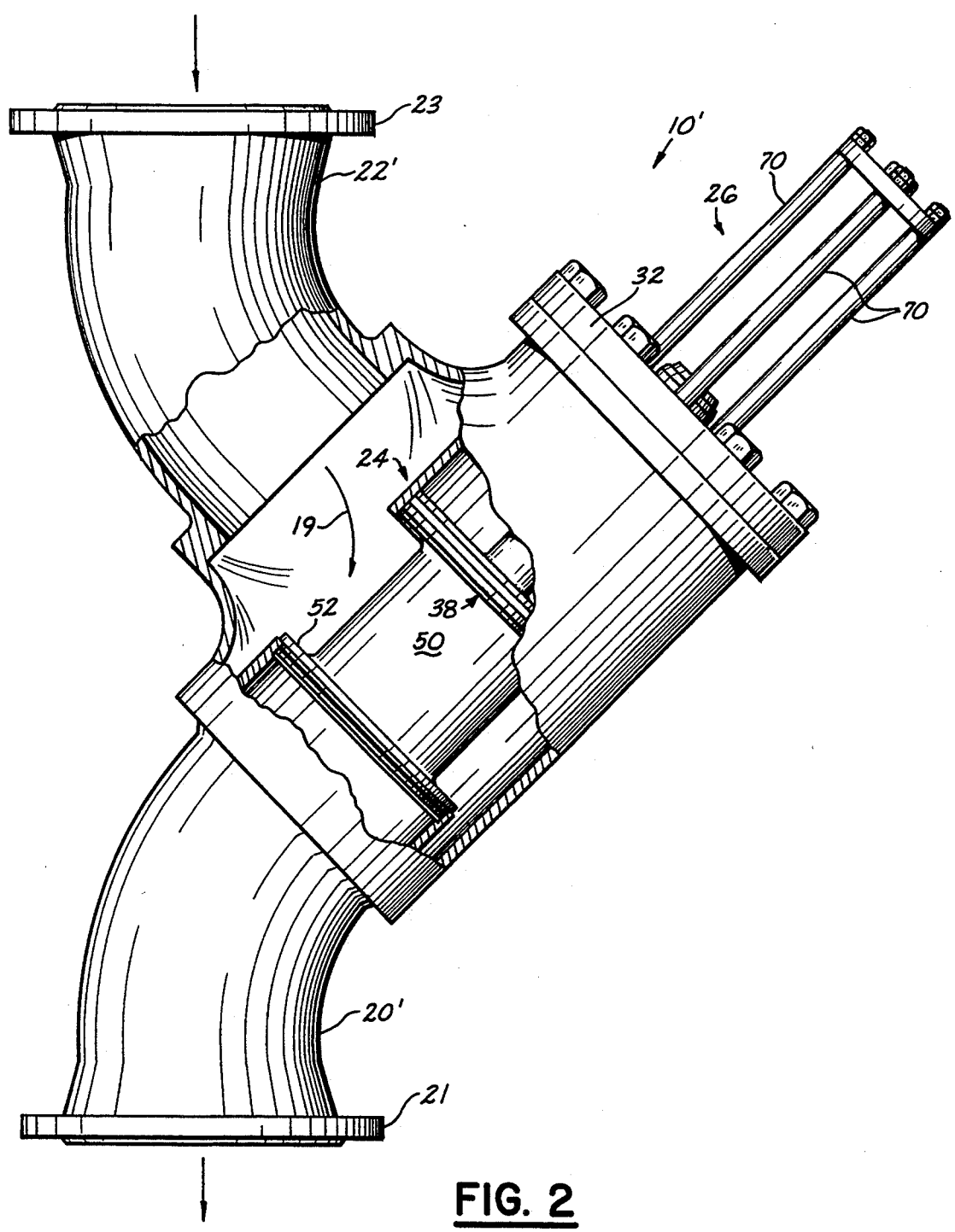
FIG. 2 is an elevational view, with parts broken away, of another embodiment having axially aligned inlet and outlet openings.

Referring also to FIG. 2, a second embodiment of the valve is indicated at 10' in which identical parts have identical reference numerals.

It is sometimes impractical to utilize a right angular valve, as illustrated by FIG. 1, and field conditions necessitate that the valve be installed in-line. To accomplish this the inlet and outlet necks of the embodiment 10' as indicated at 20' and 22' are respectively elongated and curved in a cooperative direction, so that the respective bolt flanges 21 and 23 on the neck members are parallel and in coaxial alignment with respect to each other to be interposed in a pipe line, not shown.

OPERATION

The selected valve 10 or 10' is connected with a pipe or fluid conductor to protect equipment or the conductor from excessive fluid pressure.

Initially, the valve is in a fluid passageway closed position, as illustrated by the solid lines in the drawings, wherein the passageway 19 is closed by the smaller outlet piston 52 seated on the inwardly projecting the end of the sleeve 28.

As explained hereinabove, the periphery of the guide piston 38 is diametrically greater than the diameter of the piston 52 so that a larger area of the piston 38 is exposed to the upstream fluid pressure within the valve body than is exposed to the fluid pressure by the flange 52, thus, generating a differential in pressure acting on the pistons and the collapsible pin 62. The difference in diameters partially balances out the greater portion of the fluid pressure within the valve body, so that this fluid pressure can be controlled by predetermined rating of the collapsible pin 62 and its pin cage means.

Downstream fluid, not shown, fills the outlet port 16, the piston tube 50 and sleeve chamber 39 and its pressure against the piston 38 surface facing the cap 32 around the piston rod 40 and the downstream surfaces forming the piston 52 being equal is completely balanced across the position of the piston 38 thereby allowing the collapsible pin means to accurately monitor the upstream fluid pressure in the valve.

When the upstream pressure differential on the pistons exceeds a predetermined value this pressure moves the pistons 38–52 and piston rod 40, as a unit, toward the pin cage means 26 which collapses or buckles the pin 62 toward its dotted line position and opens the flow passageway. The piston 38 impact on the sleeve cap 32 is cushioned by the resilient members 98 secured to the inner surface of the sleeve cap 32.

As the piston 38 moves upwardly, as viewed in FIG. 1, gas or fluid in the chamber 39 is exhausted downstream through the piston apertures 49. After pressure in the valve has been released, and fluid pressure in the conductor shutoff, the valve may be reset by manually forcing the piston rod inwardly to seat the piston 52 on the sleeve 28. The collapsed pin 62 is removed and the pin holder 68 is temporarily loosened in the plate 66 sufficiently to install a new replacement pin, not shown, and place the valve in fluid pressure monitoring position.

Obviously the invention is susceptible to changes or alterations without defeating its practicability. Therefore, we do not wish to be confined to the preferred embodiment shown in the drawings and described herein.

We claim:

1. A relief valve for connection with a large diameter conductor containing several thousand atmospheres of fluid pressure, comprising:
    a valve body having axially spaced longitudinally aligned openings,
    one said aligned opening forming an outlet port of smaller diameter than the other said aligned opening,
    said body having a lateral opening forming the inlet port of a fluid passageway through the body;
    sleeve means projecting axially inward from each said aligned opening including a guide sleeve having a centrally bored cap for closing the said other aligned opening;
    piston means including spaced-apart pistons having unequal end surface areas exposed to upstream fluid pressure and having other equal end surface areas exposed to downstream fluid pressure and supported by the sleeve means for normally closing the fluid passageway and balancing downstream fluid pressure;
    a piston rod projecting outwardly through the sleeve cap opposite the outlet port; and,
    collapsible pin means including a pin having a predetermined buckling point axially supported by the outwardly projecting end of the piston rod for maintaining said piston means in fluid passageway closed position while the upstream fluid pressure differential on said pistons is less than the buckling point of the pin in accordance with Euler's law.

2. The relief valve according to claim 1 in which the collapsible pin means includes:
    pin cage means axially projecting outward from the guide sleeve cap; and,
    a collapsible pin axially supported between the outward end portions of said pin cage means and said piston rod.

3. The relief valve according to claim 2 in which the piston means further includes:
    a guide piston and a smaller diameter outlet piston,
    said guide piston normally disposed adjacent the inward limit of the guide sleeve forming a guide sleeve chamber and axially slidable toward the guide sleeve cap,
    said outlet piston overlying the inward end of the other said inwardly projecting sleeve in fluid passageway closed position; and,
    the central portion of said guide piston having an aperture for exhausting and admitting fluid from and to the sleeve chamber when the guide piston is moved toward and away from the sleeve cap.

4. The relief valve according to claim 3 in which the axes of the inlet and outlet ports are disposed in right angular relation.

5. The relief valve according to claim 3 in which the axes of the inlet and outlet ports are disposed in aligned relation.

6. A relief valve for connection with a large diameter conductor containing fluid under greater than atmospheric pressure, comprising:
    a valve body having axially spaced longitudinally aligned openings,
    one said aligned opening forming an outlet port of smaller diameter than the other said aligned opening,
    said body having a lateral opening forming the inlet port of a fluid passageway through the body;
    sleeve means projecting axially inward from each said aligned opening including an outlet port sleeve of equal diameter with respect to the outlet port and a guide sleeve of greater diameter than the outlet port;
    a centrally bored cap having an annular outstanding flange for closing the outward end of the guide sleeve;
    piston means including:
    an apertured guide piston slidable in said guide sleeve forming a sleeve chamber and closing its end opposite said cap against upstream fluid pressure;
    an outlet piston axially connected with said guide piston and having an outer diameter closely received by said outlet port sleeve for normally closing the latter against upstream fluid pressure;
    a piston rod projecting outwardly through the sleeve end cap opposite the outlet port; and,
    collapsible pin means including a pin having a predetermined buckling point axially supported by the outwardly projecting end of the piston rod for maintaining said piston means in fluid passageway closed position while the upstream fluid pressure differential on said pistons is less than the buckling point of the pin in accordance with Euler's law.

7. The relief valve according to claim 6 in which the cross section area of said piston rod is equal to the difference in areas of the surfaces of the pistons facing the downstream fluid pressure.

8. The relief valve according to claim 7 in which the collapsible pin means includes:
    pin cage means including elongated members axially projecting outward from the guide sleeve cap; and, a plate interconnecting the end portions of said members opposite the guide sleeve cap and supporting the end portion of said pin opposite the piston rod.

9. The relief valve according to claim 8 in which the axes of the inlet and outlet ports are disposed in right angular relation.

10. The relief valve according to claim 8 in which the axes of the inlet and outlet ports are disposed in aligned relation.

11. A relief valve for connection with a large diameter conductor containing fluid under greater than atmospheric pressure, comprising:

a valve body having inlet and outlet ports defining a flow passageway adapted to be interposed in the conductor;

piston means including spaced-apart pistons slidably supported by the body and having unequal surface areas exposed to upstream fluid pressure for normally closing the passageway when the upstream fluid pressure is below a predetermined value and having other equal surface areas exposed to and balancing downstream fluid pressure;

a piston rod projecting outwardly of the body; and, collapsible pin means including a pin having a predetermined buckling point axially supported by the outwardly projecting end of the piston rod for maintaining said piston means in fluid passageway closed position while the upstream fluid pressure differential on said pistons unequal surface areas is less than the buckling point of the pin in accordance with Euler's law.

12. The relief valve according to claim 11 in which the cross section area of said piston rod is equal to the difference in areas of the pistons facing the downstream fluid pressure.

13. The relief valve according to claim 12 in which the collapsible pin means includes:

pin cage means including elongated members axially projecting outward parallel with the piston rod; and, a plate interconnecting the end portions of said members opposite the body and supporting the end portion of said pin opposite the piston rod.

14. The relief valve according to claim 13 in which the axes of the inlet and outlet ports are disposed in right angular relation.

15. The relief valve according to claim 13 in which the axes of the inlet and outlet ports are disposed in aligned relation.

* * * * *